United States Patent
Hagemann

[15] 3,682,909
[45] Aug. 8, 1972

[54] S-TRIAZINE DERIVATIVES

[72] Inventor: Hermann Hagemann, Cologne, Germany

[73] Assignee: Farbenfabriken Bayer Aktiengesellschaft, Leverkusen, Germany

[22] Filed: May 1, 1970

[21] Appl. No.: 33,930

[30] Foreign Application Priority Data

May 31, 1969 Germany..........P 19 27 921.1

[52] U.S. Cl.................................260/248 NS, 71/93
[51] Int. Cl..............................................C07d 55/38
[58] Field of Search................................260/248 NS

[56] References Cited

UNITED STATES PATENTS 3,535,360  10/1970  Holtschmidt et al...260/248 X

*Primary Examiner*—John M. Ford
*Attorney*—Burgess, Dinklage & Sprung

[57] ABSTRACT s-triazine derivatives are obtained by reacting a compound of the formula

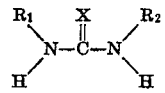

wherein $R_1$ and $R_2$, which may be the same or different, each represents hydrogen or an optionally substituted aliphatic, cycloaliphatic, araliphatic, aromatic or heterocyclic radical and X represents oxygen or sulphur
with a substantially equimolar quantity of N-chlorocarbonyl isocyanate at a temperature of from about −100° C. to about +200° C., optionally in the presence of an inert organic solvent.

The novel compounds that can be obtained by the process according to the invention have the general formula

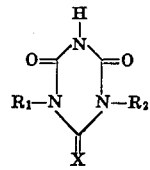

wherein X represents oxygen or sulphur and $R_1$ and $R_2$, which may be the same or different when X represents sulphur but which must be different when X represents oxygen, each represents hydrogen or an optionally substituted aliphatic, cycloaliphatic, araliphatic, aromatic or heterocyclic radical.

They can be used as herbicides.

9 Claims, No Drawings

S-TRIAZINE DERIVATIVES

This invention relates to a process for the production of s-triazine derivatives, and relates also to the compounds themselves, some of which are novel.

It has been found that s-triazine derivatives can be obtained by reacting a compound of the formula

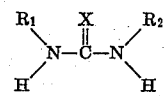

wherein $R_1$ and $R_2$, which may be the same or different, each represents hydrogen or an optionally substituted aliphatic, cycloaliphatic, araliphatic, aromatic or heterocyclic radical and X represents oxygen or sulphur with a substantially equimolar quantity of N-chlorocarbonyl isocyanate at a temperature of from about −100° C. to about +200°C., optionally in the presence of an inert organic solvent. Preferably, the reaction is carried out at a temperature in the range from −50° to +100° C., and most preferably at a temperature in the range from +20° to +60°C..

In the present context, optionally substituted aliphatic radicals ($R_1$, $R_2$) include linear and optionally branched alkyl radicals containing from one to 20, and preferably from one to eight carbon atoms, and, optionally, a double bond or triple bond as well.

Suitable cycloaliphatic radicals preferably have from five to 12 and most preferably have five, six or eight carbon atoms in the ring system.

Optional substituents on the aliphatic or cycloaliphatic radical include lower O-alkyl and S-alkyl radicals (preferably one to four carbon atoms) and halogens (preferably fluorine or bromine) or cyano radicals and, on the cycloaliphatic radicals, lower alkyl groups ($C_{1-4}$).

Araliphatic radicals ($R_1$, $R_2$) contain one to four and preferably one or two carbon atoms in the aliphatic portion, and a naphthyl, or preferably a phenyl, radical in the aromatic portion.

Aromatic radicals ($R_1$, $R_2$) include those with up to 14 carbon atoms in the ring system, the naphthyl radical, and especially the phenyl radical, being mentioned by way of preference.

Heterocyclic radicals ($R_1$, $R_2$) contain five, six or seven ring members; with an oxygen or sulphur atom, or a nitrogen atom substituted by a lower alkyl radical (preferably one to four carbon atoms), being mentioned by way of preference as hetero atoms or groups. The hetero ring system may optionally be annellated with a benzene ring which optionally may also be partially hydrogenated.

In addition to the substituents already mentioned in respect of the aliphatic radicals, suitable substituents on the araliphatic, aromatic or heterocyclic ring system include nitro groups and lower (preferably one or two carbon atoms) halogenoalkyl groups (preferably fluoroalkyl or chloroalkyl), in which case the halogen atoms may be the same or different. The trifluoromethyl radical is mentioned by way of example as a preferred halogenoalkyl radical.

The reaction components are generally used in substantially stoichiometric quantities. In order to obtain as complete a reaction as possible, it may be of advantage in some instances to use the relatively inexpensive N-chlorocarbonyl isocyanate in an excess of up to around 10 percent by weight.

The starting compounds used for the process according to the invention are known and can be obtained by known processes.

Examples of ureas and thioureas suitable for use in the process according to the invention include those obtained by reacting the following isocyanates and isothiocyanates with primary amines:
p-trifluoromethylphenyl isocyanate; p-nitrophenyl isocyanate; methyl isocyanate; isopropyl isocyanate; t-butyl isocyanate; cyclohexyl isocyanate; allyl isocyanate; β-chloroethyl isocyanate; β-naphthyl isocyanate; benzyl isocyanate; stearyl isocyanate; β-cyanoethyl isocyanate; allyl isothiocyanate; phenyl isothiocyanate; methyl isothiocyanate; ethyl isocyanate; m-propyl isocyanate; n-butyl isocyanate; isobutyl isocyanate; 2-ethylhexyl isocyanate; dodecyl isocyanate; tetradecyl isocyanate; and hexadecyl isocyanate;

In addition to the amines on which the isocyanates and isothiocyanates are based, the following amines, for example, may also be used as primary amines:
2-aminopyridine; 2-aminothiazole; 2-aminobenzthiazole; 2-amino-1-methyl-cyclohexane; hexahydrobenzylamine; 2-chloroaniline; 3-nitroaniline; 2-chloro-4-nitroaniline; 5-chloro-2-aminotoluene; 4-chloro-3-aminobenzotrifluoride; 1-amino-2-phenylethane; 2-amino-1-isopropylbenzene; 5-amino-1,2,4-trimethyl benzene; 5,6,7,8,-tetrahydronaphthyl-1-amine; 1-aminonaphthylene; 3,5-dichloroaniline; 2,4,5-trichloroaniline; 2,4-dichloroaniline; 2,3-dichloroaniline; 2,5-dichloroaniline; 3-chloroaniline; 4-chloroaniline; 4-chloro-2-nitroaniline; aniline; 2-nitroaniline; 4-nitroaniline; 5-chloro-2-nitroaniline; 4-chloro-3-nitroaniline; 3-chloro-4-nitroaniline; 4,6-dichloro-2-nitroaniline; 2,5-dichloro-4-nitroaniline; 2,6-dichloro-4-nitroaniline; 2-aminotoluene, 3-chloro-2-aminotoluene; 4-chloro-2-aminotoluene; 5-nitro-4-amino-1,3-dimethyl benzene; 6-nitro-4-amino-1,3-dimethyl benzene; 5-amino-1,3-dimethylbenzene; 5-amino-1,3-bis-trifluoromethyl benzene; 2-amino-1,4-dimethyl benzene; 2-amino-1-methyl-3-ethyl benzene; 6-amino-1,2,4-trimethyl benzene; 2-amino-1,3,5-trimethyl benzene; 2-amino-1,3-diethyl benzene; 4-amino-1,3-dimethyl-5-ethyl benzene; 4-amino-1-methyl-3,5-diethyl benzene; 2-amino-1,3-diisopropyl benzene; 5,6,7,8-tetrahydro-2-naphthylamine; β-bromoethylamine; 1-cyano-1-phenylethylamine, 1-cyano-1-methylethylamine; 5-chloro-2-aminobenzotrifluoride; 6-chloro-2-amino-toluene; 4,5-dichloro-2-aminotoluene; 3-nitro-2-aminotoluene; 4-nitro-2-aminotoluene; 5-nitro-2-aminotoluene; 6-nitro-2-aminotoluene; 4-chloro-5-nitro-2-aminotoluene; 3-aminotoluene; 4-chloro-3-aminotoluene; 6-chloro-3-aminotoluene; 4,6-dichloro-3-aminotoluene; 4-aminotoluene; 2-chloro-4-aminotoluene; 2-nitro-4-aminotoluene; 3-nitro-4-aminotoluene; 2-amino-1-ethylbenzene; 1-amino-1-phenylethane; 2,3-dimethyl aniline; 3,4-dimethyl aniline; 2,6-dimethyl aniline; and 2,4-dimethyl aniline.

Chlorinated hydrocarbons, for example methylene chloride, chloroform and chlorobenzene, are inert organic solvents suitable for use in the process according to the invention. The process according to the invention is carried out in the usual way by combining the reaction components in any order. In general, it has proved to be of advantage initially to introduce the chlorocarbonyl isocyanate and to heat the reaction mixture to around 60°C. in order to complete the reaction. The reaction mixtures are worked up in the usual way.

The novel compounds that can be obtained by the process according to the invention have the general formula

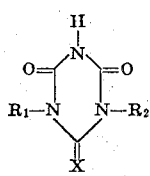

wherein X represents oxygen or sulphur and $R_1$ and $R_2$, which may be the same or different when X represents sulphur but which must be different when X represents oxygen, each represents hydrogen or an optionally substituted aliphatic, cycloaliphatic, araliphatic, aromatic or heterocyclic radical.

The compounds that can be obtained by the process according to the invention may be used in the production of plant protection agents, although the compounds themselves also show herbicidal activity:

Post emergence test
  Solvent: 5 parts by weight of acetone
  Emulsifier: 1 part by weight of alkylaryl-polyglycol ether (substituted phenol reacted with 11 mols of ethylen oxide)

To make up suitable active ingredient preparations, 1 part by weight of the active ingredient is mixed with the specified quantity of solvent, the specified quantity of emulsifier is added and the resulting concentrate is subsequently diluted with water to the required concentration.

Test plants which have grown to a height of from 5 to 15 cm are sprayed with the active ingredient preparation in such a way that the quantities of active ingredient specified in the Table are applied per unit area. Depending upon the concentration of the spray, the quantity of water used amounts to from 1,000 to 2,000 liters/ha. After 3 weeks, the extent to which the plants have been damaged is determined, and is identified by the numbers 0 to 5, which have the following meaning:

0 = no effect
1 = a few slightly burnt patches
2 = distinct leaf damage
3 = a few leaves and stalk sections killed
4 = some of the plants destroyed
5 = all the plants destroyed The active ingredients mentioned by way of example and used, the quantities in which they are used and the results are set out in the following Table in which the radicals $R^1$ and $R^2$ according to the general formula

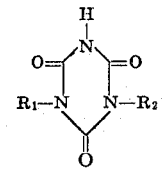

have the following meaning:

| Preparation | | Quantity of active ingredient used, kg./ha. | Echino- cloa | Cheno- podium | Sin- apis | Oats | Wheat |
| --- | --- | --- | --- | --- | --- | --- | --- |
| $R^1$ | $R^2$ | | | | | | |
| ⟨H⟩ | CH$_3$— | 8 | 5 | 5 | 5 | 3 | 3 |
| | | 4 | 4 | 4 | 4 | 2 | 2 |
| | | 2 | 3 | 3 | 3 | 1 | 1 |
| ⟨ ⟩ | CH$_3$— | 8 | 5 | 5 | 5 | 3 | 4 |
| | | 4 | 4 | 4 | 5 | 2 | 2 |
| | | 2 | 3 | 3 | 5 | 1 | 1 |
| Cl—⟨ ⟩—Cl | CH$_3$— | 8 | 5 | 5 | 5 | 3 | 3 |
| | | 4 | 4 | 4 | 5 | 2 | 2 |
| | | 2 | 3 | 3 | 4 | 1 | 1 |

The other compounds that can be obtained by the process according to the invention also show a comparable herbicidal activity.

EXAMPLE 1

43.8 g (0.2 mol) of N-methyl-N'-(3,4-dichlorophenyl)-urea are introduced into 250 ml of methylene chloride. 22 g (0.21 mol) of N-chlorocarbonyl isocyanate are then added dropwise with stirring over a period of 5 minutes. This produces an increase in temperature, the solvent begins to boil vigorously and a clear solution is briefly obtained. HCl is given off for a period of 1 Hour at boiling point, most of the s-triazine formed being precipitated. After cooling and filtering under suction, 48 g of a compound corresponding to the formula

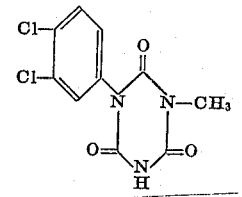

are obtained in the form of colorless crystals melting at 233°C. Another 6 g of identical material can be isolated from the mother liquor. This corresponds to a yield of 93.7 percent of the theoretical.
Elementary analysis:

Calc: 41.7% C; 2.43% H; 24.3% Cl; 16.68% O; 14.58% N

Found: 42.0% C; 2.7 % H; 24.3% Cl; 16.8 % O; 14.5 % N

The N-chlorocarbonyl isocyanate used for the reaction is obtained as follows:

229.5 g (1.43 mol) of N-chlorocarbonyl isocyanide dichloride are placed in a suitable vessel and 137.5 g (1.43 mol) of methyl sulphonic acid added dropwise at 20°C. in such a way that the internal temperature rises to 50°C. The hydrogen chloride bound in the form of carbamic acid chloride is then removed through a column over a period of some 5 hours during which the sump temperature gradually rises, and the N-chlorocarbonyl isocyanate left is separated from the methyl sulphochloride by distillation. N-chlorocarbonyl isocyanate boiling at 64°C/760 Torr is obtained in a yield of 106 g or 70 percent of the theoretical.

EXAMPLE 2

28 g (0.2 mol) of N,N'-diallyl urea are dissolved in 100 ml of ethylene chloride and the resulting solution is added dropwise over a period of 30 minutes to a solution of 21.1 g (0.2 mol) of N-chlorocarbonyl isocyanate in 50 ml of methylene chloride. HCl is given off over a period of 2 hours at boiling point, after which the product is cooled and the s-triazine formed is filtered under suction. A compound corresponding to the formula

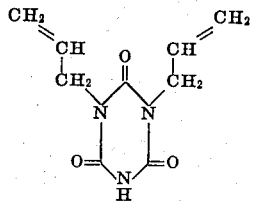

with a melting point of 148°C. is obtained in a yield of 36 g or 86 percent of the theoretical.

Elementary analysis:
   Calc: 51.6% C; 5.26% H; 23.0% O; 20.1% N
   Found: 51.5% C; 5.6 % H; 23.1% O; 20.4% N

EXAMPLE 3

20.8 g (0.2 mol) of N,N'-dimethyl thiourea are reacted as in Example 2. The precipitated product still contains substantially the calculated quantity of HCl and dissolves completely, except for a small residue, in cold water. A compound corresponding to the formula

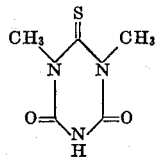

crystallizes out after a short time, m.p. 194° – 195°C.

Elementary analysis:
   Calc: 34.7% C; 4.05% H; 18.5% O; 24.25% N; 18.5% S
   Found: 34.9% C; 4.2% H; 18.6% O; 24.4% N; 18.5% S The following compounds are similarly obtained:

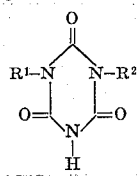

| $R_1$ | $R_2$ | M.P. |
|---|---|---|
| phenyl (H) | $CH_3$ | 214° |
| phenyl | $CH_3$ | 240° |
| $CH_3$ | $CH_3$ | 218–219° |
| $(CH_3)_2CH$ | $(CH_3)_2CH$ | 163° |
| $(CH_3)_3C$ | $(CH_3)_3C$ | 189° |

What we claim is:

1. Process for the preparation of a s-triazine derivative having the formula

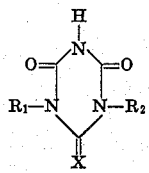

wherein a compound af the formula

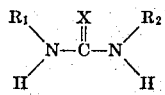

wherein $R_1$ and $R_2$ can be the same or different, and each represents hydrogen or a member selected from the group of alkyl having one to 20 carbon atoms, cycloalkyl having five to eight carbon atoms in the ring system, phenyl alkyl having one to four carbon atoms in the alkyl group, naphthyl alkyl having one to four carbon atoms in the alkyl group, and carbocyclic aryl with six to 14 carbon atoms in the ring system and X is oxygen or sulphur, is reacted with N-chlorocarbonyl isocyanate at a temperature from −100° to +200°C.

2. A process as claimed in claim 1 wherein the temperature is from −50° to +100°C.

3. A process as claimed in claim 1 wherein the temperature is from +20° to +60°C.

4. A process as claimed in claim 1 wherein the reaction is carried out in an inert organic solvent.

5. A process as claimed in claim 4 wherein the inert organic solvent is a chlorinated hydrocarbon.

6. A process as claimed in claim 1 wherein the reactants are employed in substantially equimolar amounts.

7. Compound having the formula

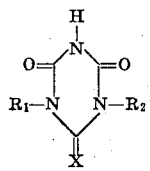

wherein X is oxygen or sulphur, and $R_1$ and $R_2$, which may be the same or different when X is sulphur but must be different when X is oxygen, each represents hydrogen or a member selected from the group of alkyl having one to 20 carbon atoms, cycloalkyl having five to eight carbon atoms in the ring system, phenyl alkyl having one to four carbon atoms in the alkyl group, naphthyl alkyl having one to four carbon atoms in the alkyl group, and carbocyclic aryl with six to 14 carbon atoms in the ring system.

8. Compound according to claim 7 wherein X represents oxygen, $R_1$ represents methyl and $R_2$ represents cyclohexyl, phenyl or 3,4-dichlorophenyl.

9. Compound according to claim 7 wherein X represents sulphur and $R_1$ and $R_2$ stand for methyl.

* * * * *